United States Patent
Min

(10) Patent No.: US 8,769,837 B2
(45) Date of Patent: Jul. 8, 2014

(54) APPARATUS FOR MARKING GUIDELINE FOR TRANSPORTATION VEHICLE

(75) Inventor: Byung Dan Min, Gwangju (KR)

(73) Assignee: Comet Bicycle Manufacturing Co., Ltd., Kyounggi-Do (KR)

( * ) Notice: Subject to any disclaimer, the term of this patent is extended or adjusted under 35 U.S.C. 154(b) by 188 days.

(21) Appl. No.: 13/519,815

(22) PCT Filed: Jun. 16, 2010

(86) PCT No.: PCT/KR2010/003885
§ 371 (c)(1),
(2), (4) Date: Jun. 28, 2012

(87) PCT Pub. No.: WO2011/081263
PCT Pub. Date: Jul. 7, 2011

(65) Prior Publication Data
US 2012/0285026 A1  Nov. 15, 2012

(30) Foreign Application Priority Data
Dec. 28, 2009  (KR) .................. 10-2009-0132133

(51) Int. Cl.
*G01B 11/22* (2006.01)
(52) U.S. Cl.
USPC ........................... 33/264; 33/286; 33/DIG. 21
(58) Field of Classification Search
CPC ........ A01B 69/001; B60Q 1/02; G01B 11/26; G01B 11/27; G01C 15/004
USPC ......... 33/262, 263, 264, 275 R, 286, DIG. 21
See application file for complete search history.

(56) References Cited

U.S. PATENT DOCUMENTS

| 7,650,698 | B2 * | 1/2010 | Stewart, III | 33/264 |
| 8,365,422 | B1 * | 2/2013 | Ott | 33/264 |
| 2001/0008446 | A1 * | 7/2001 | Hopfenmuller | 33/288 |
| 2009/0144993 | A1 * | 6/2009 | Brauch | 33/286 |
| 2011/0216199 | A1 * | 9/2011 | Trevino et al. | 33/264 |
| 2012/0137528 | A1 * | 6/2012 | Bloodworth | 33/227 |
| 2013/0037339 | A1 * | 2/2013 | Hickox | 33/264 |
| 2014/0000120 | A1 * | 1/2014 | Fishel | 33/228 |
| 2014/0043309 | A1 * | 2/2014 | Go et al. | 348/135 |

FOREIGN PATENT DOCUMENTS

| JP | 2002-201617 | 7/2002 |
| JP | 2005-009072 | 1/2005 |
| KR | 1020040004212 | 1/2004 |
| KR | 100821361 | 4/2008 |
| KR | 100832502 | 5/2008 |
| KR | 20-2010-0009572 | 10/2010 |

* cited by examiner

*Primary Examiner* — G. Bradley Bennett
(74) *Attorney, Agent, or Firm* — IPLA P.A.; James E. Bame

(57) ABSTRACT

The device relates to a device for marking, during nighttime riding through a transport vehicle such as bicycles, two-wheeled vehicles, electric wheelchairs, etc., a rider's temporary dedicated road lines by laser-emitting means mounted at the rear side of the transport vehicle, thereby ensuring the safety of the rider of the transport vehicle. The device includes: laser-emitting modules adapted to form luminous lines spaced apart from each other by a predetermined distance on the road beside or behind the transport vehicle; a power supply module adapted to supply power to the laser-emitting modules; an external housing adapted to accommodate the laser-emitting modules thereinto; and a fixing module adapted to fix the external housing to the transport vehicle.

6 Claims, 6 Drawing Sheets (a)

(b)

APPARATUS FOR MARKING GUIDELINE FOR TRANSPORTATION VEHICLE

BACKGROUND OF THE INVENTION

The present invention relates to a device for marking, during nighttime riding through a transport vehicle such as bicycles, two-wheeled vehicles, electric wheelchairs, etc., a rider's temporary dedicated road lines by laser-emitting means mounted at the rear side of the transport vehicle, thereby ensuring the safety of the rider of the transport vehicle.

BACKGROUND ART

Generally, bicycles are ones of modern simple transport means provided widely in many regions, and with the rapid development of societies and the complication of traffic cultures, even if high technology convenient transport vehicles like automobiles have been variously developed and marketed, the bicycles have increasingly prevailed and are also provided in a popular form of recreation and children's toys as well as simple transport vehicles.

When compared with the remarkable increase of the number of bicycles used, however, the dedicated roads for bicycles are not provided sufficiently by real social environments, and thus, a large number of bicyclists unfortunately make use of the roads for automobiles.

Since the bicycle is generally comprised of a handle, a frame constituting a body, rotated wheels, and a brake, and it does not include a separate riding safety device, which causes the bicyclist to be exposed always to the problem that he or she may collide against automobiles moving on the road during riding.

Moreover, the bicycle is the transport vehicle moving at a low speed, and thus, if it is traveled on remote roads for automobiles or on narrow alleyways during nighttime, the drivers of the automobiles moving at high speeds do not easily recognize the existence of the bicyclist. Even though they recognize the bicyclist before them, besides, they cannot easily find whether the bicycle is moving or stops, thereby causing some dangers where life loss and injury occur by collision and safety accidents happen.

Especially, if bicyclists are children who have weak recognition on surrounding situations and the dangers to occur, they often show unexpected behaviors during riding, and accordingly, it is hard for the drivers of the automobiles behind the bicycles to appropriately handle them, which results in the increase of the occurrence of the safety accidents during the children's bicycle riding.

So as to prevent the safety accident from being generated during bicycle riding, on the other hand, there has been proposed a bicycles having a luminous reflection plate attached on the rear side thereof, but the luminous reflection plate does not perform the functions during daytime and also performs the reflection function only by the incident light from the outside even during nighttime, thereby just showing a substantially bad warning function against the surrounding situations.

Moreover, the luminous reflection plate just allows automobile drivers to just recognize the existence of the bicycle before them, but does not provide the function of finding whether the bicycle is moving or stops, thereby still having the danger of the occurrence of the safety accidents during the riding of the bicycle.

DISCLOSURE

SUMMARY OF THE INVENTION

Accordingly, the present invention has been made in view of the above-mentioned problems occurring in the prior art, and it is an object of the present invention to provide a device for marking riding lines for a transport vehicle that has a laser-emitting module attached on the rear side of the transport vehicle to produce riding lines (temporary dedicated lines) on the road beside or behind the transport vehicle, thereby allowing automobile drivers to recognize the existence of the transport vehicle, allowing the drivers having a short viewing distance to find the transport vehicle existing before or beside their automobiles to maintain the safety distance therefrom, and previously preventing safety accidents from occurring.

To accomplish the above object, according to the present invention, there is provided a device for marking riding lines for a transport vehicle, including: laser-emitting modules adapted to form luminous lines spaced apart from each other by a predetermined distance on the road beside or behind the transport vehicle; a power supply module adapted to supply power to the laser-emitting modules; an external housing adapted to accommodate the laser-emitting modules thereinto; and a fixing module adapted to fix the external housing to the transport vehicle.

According to the present invention, preferably, each of the laser-emitting modules includes a light source-producing unit adapted to produce the luminous line therefrom and a light-guiding unit adapted to adjust the direction of the light produced from the light source-producing unit to induce the formation of the luminous line.

According to the present invention, preferably, the light source-producing unit makes use of a diode pumped solid state (DPSS) RGB laser as luminous sources.

According to the present invention, preferably, the light-guiding unit includes a line-forming module adapted to diffuse or collect the light emitted from the light source-producing unit in such a manner as to allow the diffused or collected light to be formed in a shape of a line having a given length along the road.

According to the present invention, preferably, the fixing module includes a gripping part fixed to a given position of the transport vehicle and a fixing part insertedly fixed into the gripping part by means of a fixing member, so that the external housing is moved up and down around the fixing member.

According to the present invention, preferably, the laser-emitting modules are disposed correspondingly on both sides of the lower portion of the external housing, and the external housing has a warn-indicating module mounted thereinto, the warn-indicating module being formed of at least one or more LED lamps.

According to the present invention, preferably, a portion of the external housing, in which the warn-indicating module is mounted to emit the light of LED lamps to the outside, is formed of a cover member made of a light permeable material.

According to the present invention, preferably, the power supply module is formed of a lithium-ion battery, a rechargeable battery, or a self generating module, which applies the power to the laser-emitting module or the LED lamps.

Advantageous Effect

According to the present invention, the device for marking riding lines for a transport vehicle has the laser-emitting modules adapted to mark the riding lines (temporary dedicated lines) on the road behind the transport vehicle including two-wheeled vehicles such as bicycles, electric wheelchairs, and the like, so that the transport vehicle forms the temporary riding lines by itself during nighttime riding, thereby enabling the drivers of the vehicles moving behind the transport vehicle to easily recognize the distance from the transport vehicle to ensure the safety of the rider of the transport vehicle.

DETAILED DESCRIPTION OF THE INVENTION

Figure 1:
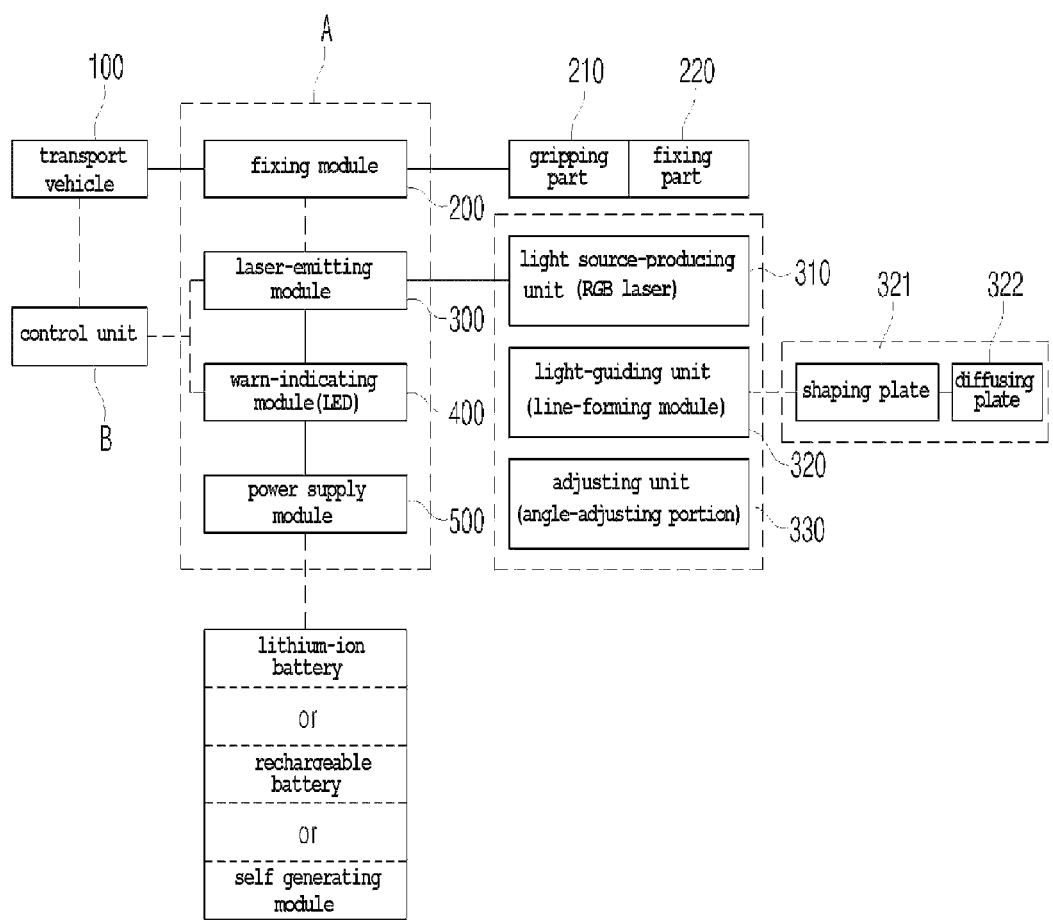
FIG. 1 illustrates the block diagram of the whole configuration of a device for marking riding lines for a transport vehicle according to the present invention.

Hereinafter, an explanation on a device for marking riding lines for a transport vehicle according to the present invention will be given with reference to the attached drawings. In the detailed description of the invention with reference to the attached drawings, further, the same components are indicated by the same reference numerals as each other. On the other hand, terms such as first, second, and the like are used to define various components, but the components are not defined by the terms used in the description, but discriminated from one another just by them.

The invention relates to a device for marking riding lines for a transport vehicle that has laser-emitting modules attached to the rear end of the transport vehicle to produce the riding lines (temporary dedicated lines) along the road beside or behind the transport vehicle, thereby making automobile drivers on the road recognize the transport vehicle so that the drivers having short viewing distance due to darkness can recognize the transport vehicle moving before or beside their vehicles and keeps the safety distance from the transport vehicle.

FIG. 1 illustrates the block diagram of the whole configuration of a device for marking riding lines for a transport vehicle according to the present invention.

Referring to FIG. 1, the device includes laser-emitting modules 300 accommodated in an external housing A attached to a transport vehicle 100 by means of a fixing module 200 in such a manner as to produce luminous lines spaced apart from each other by a given distance along the road beside or behind the transport vehicle, and a power supply module 500 adapted to supply power to the laser-emitting modules 300.

Desirably, the transport vehicle 100 adopted in the preferred embodiment of the present invention is a bicycle, but of course, it can include all kinds of transport vehicles used for movement of people. For example, the transport vehicles include wheelchairs, electric wheelchairs, electric bikes for disabled, and the like. According to the preferred embodiment, hereinafter, the device of the invention provided on the bicycle will be explained.

Figure 3:
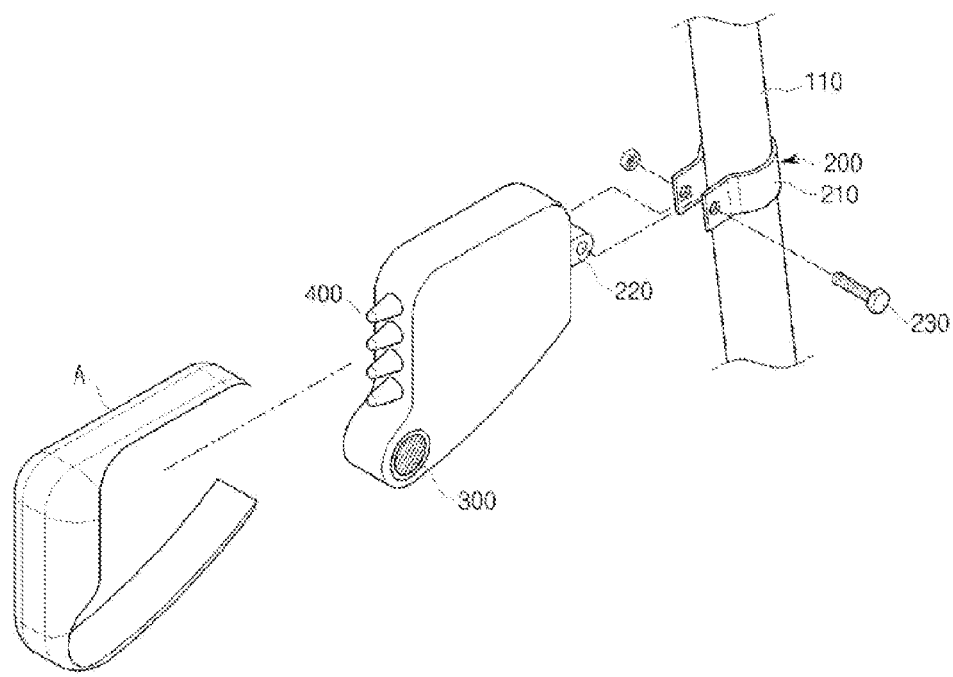
FIG. 3 illustrates the separate perspective view of the device for marking riding lines for a transport vehicle according to the present invention.

The device of the invention is mounted on a seat or a seat post of a bicycle as the transport vehicle 100, and so as to mount the device thereon, the device further includes the fixing module 200, which will be in detail described with reference to FIG. 3 later.

Especially, the laser-emitting modules 300 are accommodated in the interior of the external housing A and produce luminous lines having a given length spaced apart from each other by a given distance along the road beside or behind the bicycle moving. Each of the laser-emitting modules 300 includes a light source-producing unit 310 adapted to produce a light source therefrom and a light-guiding unit 320 adapted to adjust the direction of the light produced from the light source-producing unit 310 to induce the formation of the luminous line.

In this case, the light source-producing unit 310 makes use of various luminous sources such as LEDs, infrared lamps, and according to the present invention, desirably, the light source-producing unit 310 is formed of a unit using semiconductor lasers. For example, the unit may include a beam generator for generating a light beam having a wavelength of 0.55 μm in a visible region, a beam-shaping lens for shaping the light generated from the beam generator, and a polarizer for reflecting a portion of a vertical component onto the incident surface of the visible beam generated from the beam-shaping lens to make the visible beam polarized. More particularly, the beam-shaping lens performs the function of providing the light image having a form of a line through a line-forming module of the light-guiding unit as will be discussed later, and according to the preferred embodiment of the present invention, the two parts are all provided or any one of them is provided.

In the preferred embodiment, an example of the semiconductor lasers is a diode pumped solid state (DPSS) RGB laser as the luminous source. The diode pumped solid state (DPSS) RGB laser is a solid state laser luminescent by a laser diode and makes use of Red (632 nm), Green (532 nm) and Blue (473 nm) when the wave lengths by color are considered.

The technology where the semiconductor laser diode is used with the pumped source of the solid laser is well known in the art, which has excellent effects in high output and the efficiency of the wave length.

Further, each of the laser-emitting modules 300 includes the light-guiding unit 320 adapted to adjust the direction of the light produced from the light source-producing unit 310 to induce the formation of the luminous line, and the light-guiding unit 320 further includes a line-forming module for diffusing or collecting the light generated from the light source-producing unit 310 to form a line having a given length. The line-forming module includes a shaping plate 321 adapted to shape the produced light to the lines in such a manner as to be formed along the ground, which performs the similar function to the above-mentioned beam-shaping lens. Moreover, the line-forming module further includes a diffusing plate adapted to diffuse the produced light and a light collecting lens for collecting the diffused light to a given distance.

Furthermore, each laser-emitting module 300 includes an adjusting unit 330.

The adjusting unit 330 is adapted to allow the direction of the light produced to be inclined in every direction or at a given angle, if the light produced from the light source-producing unit 310 forms the line having the given length on the ground through the light-guiding unit 320, thereby adjusting the distance between the riding lines or the positions of the riding lines.

Figure 2:
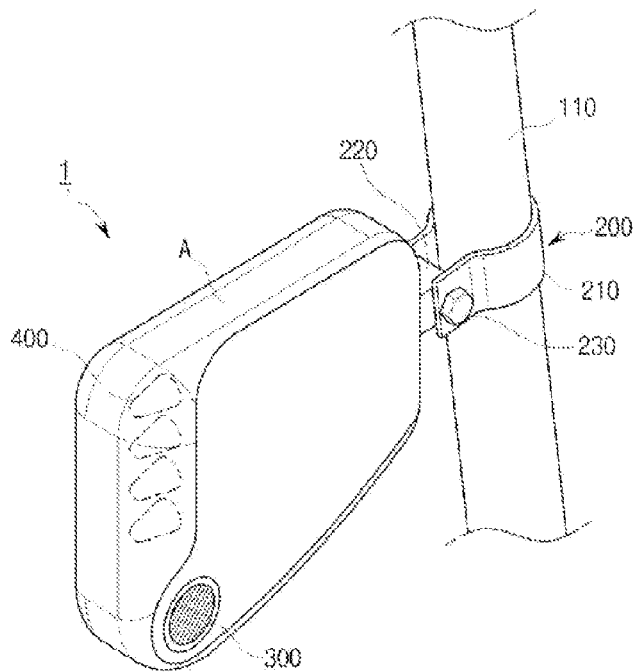
FIG. 2 illustrates the perspective view of the device for marking riding lines for a transport vehicle according to the present invention.

To do this, a given isolation space is formed in the external housing A into which each laser-emitting module 300 is inserted, so that the laser-emitting module 300 is moved in every direction with a given distance, and further, a stopper is disposed to fix the laser-emitting module 300 after the movement has been carried out (See FIG. 2). That is, the space where the laser-emitting module 300 is moved in the insertion space of the external housing A is first formed, and then, the stopper is provided to fix the laser-emitting module 300 at a desired position or angle. In addition thereto, of course, various methods can be carried out to adjust the angle of the laser-emitting module 300 within the scope and spirit of the present invention.

In addition to the laser-emitting modules 300, the device of the invention further includes a warn-indicating module 400 mounted in the external housing A.

While the laser-emitting modules 300 as the main function of the device of the invention provide the riding liens for the transport vehicle, the warn-indicating module 400 performs an auxiliary alarm function to allow the vehicles moving behind the bicycle at which the device of the present invention is mounted to easily recognize the movement of the bicycle. The warn-indicating module 400 has light-emitting sources mounted at the inside thereof, and a portion of the external housing A where the light-emitting sources is mounted is made of a transparent material or a colored (for example, red) permeable material to obtain high visibility in nighttime. Especially, desirably, the warn-indicating module 400 has at least one or more LEDs, and further, the portion of the external housing A made of the permeable material is formed with alarming images.

The power supplied to the laser-emitting modules 300 and the warn-indicating module 400 is applied from the power supply module 500, and in the preferred embodiment of the invention, the power is supplied by a lithium-ion battery. Of course, the lithium-ion battery is just one example, and accordingly, a structure in which a rechargeable battery for mobile is mounted or in which a separate rechargeable battery is mounted may be provided. Alternatively, if power is supplied through the moving force applied from the bicycle, a self generating module is disposed engaged with the power supply module of the invention, thereby performing charging or power supply. Like this, various methods for performing the power supply may be adopted, but since the light weight of the bicycle should be first considered, most preferably, the power supply is applied easily through the rechargeable or exchangeable battery.

Hereinafter, an explanation on the configuration of the device for marking riding lines for a transport vehicle according to the present invention will be given with reference to FIGS. 2 and 3. FIG. 2 illustrates the perspective view of the device for marking riding lines for a transport vehicle according to the present invention, and FIG. 3 illustrates the separate perspective view of the device for marking riding lines for a transport vehicle according to the present invention.

For example, the Figures just illustrate the device mounted on a frame portion 110 disposed at the underside of a seat of a bicycle.

As shown, the two laser-emitting modules 300 are mounted correspondingly at both lower ends of the external housing A, and a portion of the external housing A is provided with a cover member made of a red permeable material, in which the warn-indicating module 400 is mounted to emit the light of LEDs as an alarming signal to the outside. Further, the external housing A has an alarming image I formed on the lower end thereof.

Especially, each laser-emitting module 300 is formed with a given inclination on the lower end of the external housing A in such a manner as to allow the laser (in the preferred embodiment, green laser) as the light source-producing unit 310 to be emitted toward the side or back of the bicycle. Further, each laser-emitting module 300 is fixed at the given inclination or angle through the adjusting unit 330.

The external housing A of the device of the invention is fixed to a gripping part 210 adapted to encompass the frame portion 110 of the bicycle by means of a fixing part 220 protruded from one side thereof and inserted into the gripping part 210 in such a manner as to be brought into close contact with the gripping part 210, and so as to perform more stable fixing, the fixing part 220 of the external housing A is fixed to the gripping part 210 by means of a fixing member 230. In this configuration, however, it is more preferable that the external housing A should be moved up and down around the fixing member 230. In case where the external housing A is moved up and down, the positions where the riding lines are formed behind the bicycle can be freely adjusted.

Figure 4:
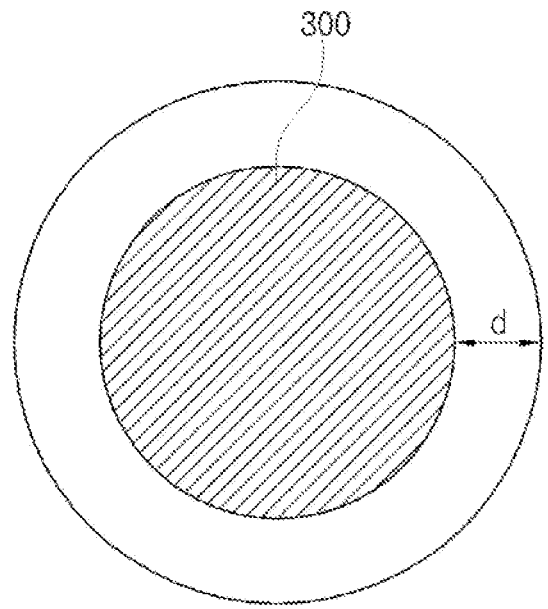
FIGS. 4 and 5 illustrate the images when the device according to the present invention is mounted on the transport vehicle.
Figure 5:
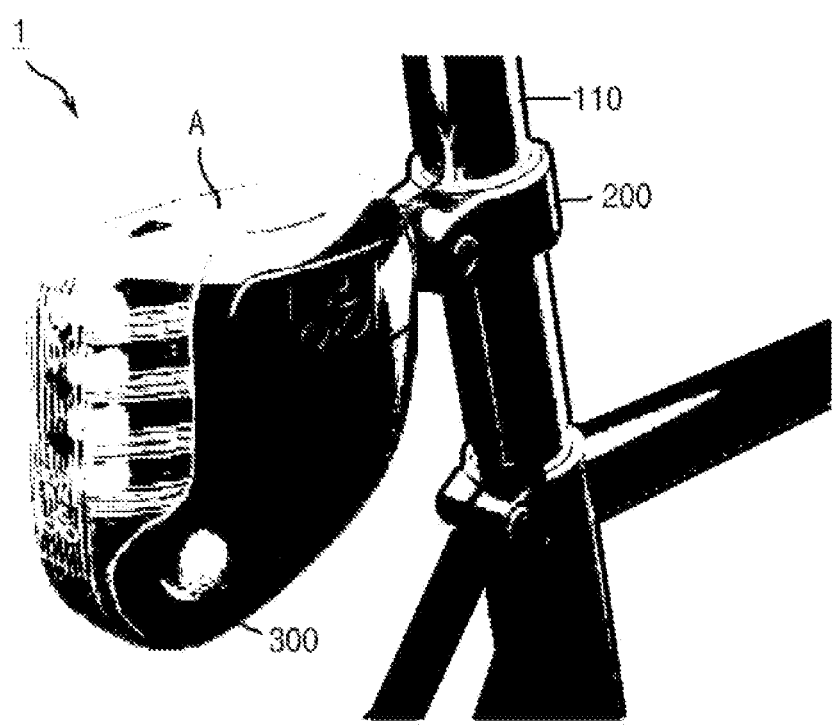
Figure 6:
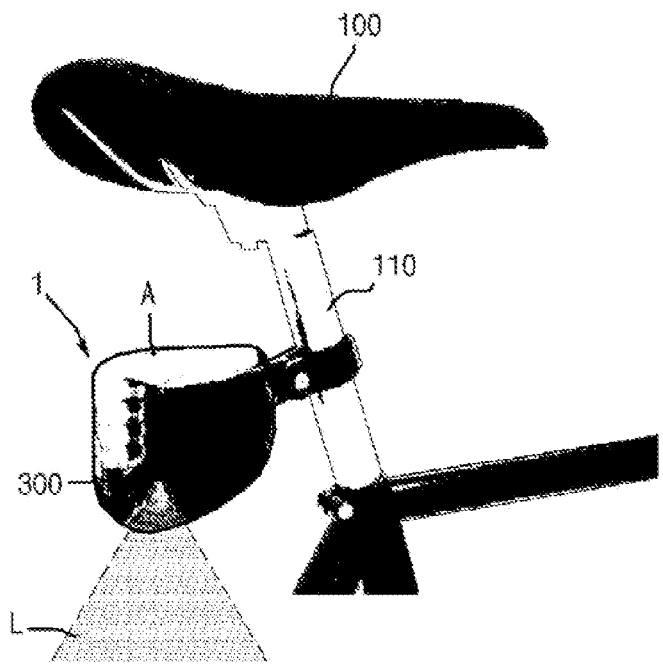
FIG. 6 illustrates the schematic view of the laser-emitting module with a given distance in the device according to the present invention.

FIGS. 4 and 5 illustrate the images when the device according to the present invention is mounted on the transport vehicle, wherein FIG. 4 illustrates the image wherein the device of the invention is fixed to the frame portion 110 of the bicycle, and FIG. 5 illustrates the image wherein the device of the invention is mounted on the frame portion 110 under the seat of the bicycle. The laser light L emitted from the laser-emitting modules 300 provides a luminous image having a form of a given line. On the other hand, FIG. 6 illustrates the schematic view of the laser-emitting module with a given distance in the device according to the present invention, wherein a given isolation interval d is formed on the portion where the laser-emitting module 300 is mounted to adjust the light-emitting angle of the laser-emitting module 300.

Figure 7:
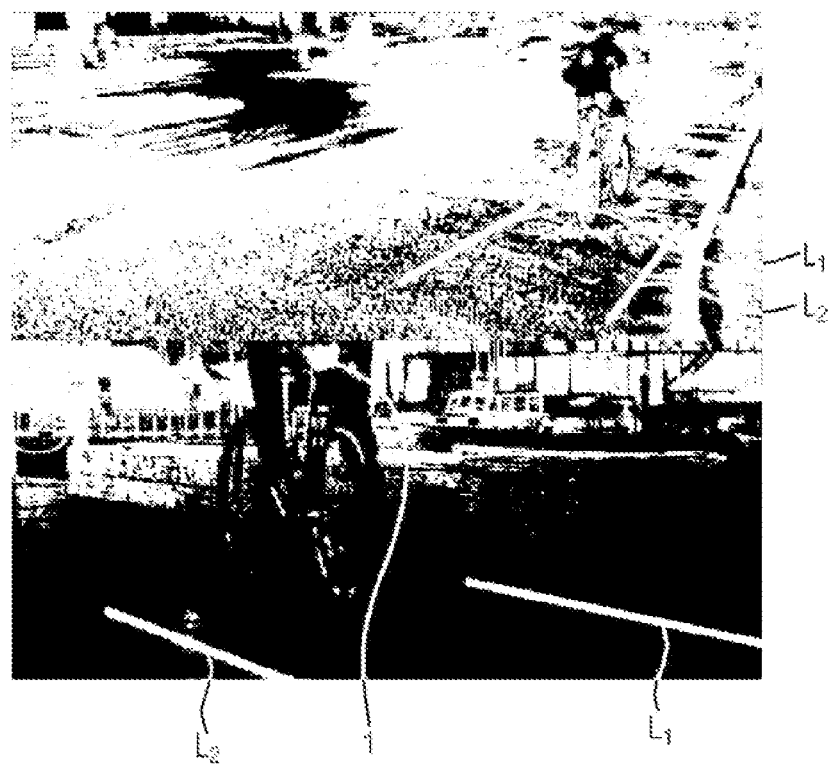
FIGS. 7 and 8 illustrate the images when the device of the invention is mounted on a bicycle and marks the riding lines during riding.
Figure 8:

FIGS. 7 and 8 illustrate the images when the device of the invention is mounted on a bicycle and marks the riding lines during riding.

Through the light emission of the laser-emitting module 300 of the device 1 mounted on the rear side of the bicycle, as shown in FIG. 7, clear and light green riding lines $L_1$ and $L_2$ as the temporary dedicated lines are formed spaced apart from each other along the road beside or behind the bicycle, which are kept during the riding, without any stopping.

FIG. 8 illustrates the image indicated by the red riding lines $L_1$ and $L_2$ using the red laser light.

In any case, through the existence of the riding lines, the drivers of the vehicles moving behind or beside the bicycle can easily recognize the moving position of the bicycle and the degree of the safety distance therefrom, thereby remarkably reducing the danger of accident and greatly decreasing the generation of accidents resulting in the loss of human life or injury. Further, if the warn-indicating module 400 provided with the LED lamps has the form of the direction-indicating lamps, it can have a function of indicating the direction to be turned of the bicycle. This is possible when the LEDs are arranged in a row, as shown in FIGS. 2 and 3, and in addition thereto, of course, they may be arranged on left and right sides. Thus, the direction-indicating function can be performed through the flashing of the luminous LEDs at the left and right sides caused by a bicyclist's manipulation.

Further, direction-indicating arrows may be formed on the surface of the external housing A, and the direction-indicating function may be performed on the rear end of the external housing A through the bicyclist's manipulation. To do this, preferably, the device of the invention further includes a switching module (not shown) mounted around the bicyclist's seat to manipulate the flashing of the LEDs or the laser-emitting module 300.

In addition to the bicycles, moreover, the device of the invention can be applied to various transport vehicles such as wheelchairs, electric wheelchairs, two-wheeled transport vehicles for disabled, and the like, and as mentioned above, if the safety of the rider using the transport vehicles can be ensured, the device of the invention can be applied to all kinds of transport vehicles.

Figure 9:
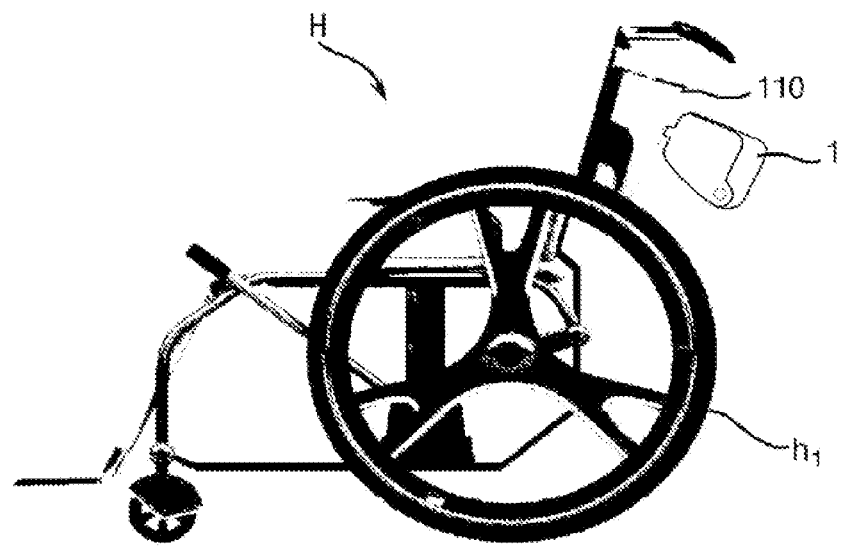
FIGS. 9a and 9b illustrate the images when the device of the invention is mounted on a two-wheeled auxiliary transport vehicle and marks the riding lines during riding.
Figure 9:
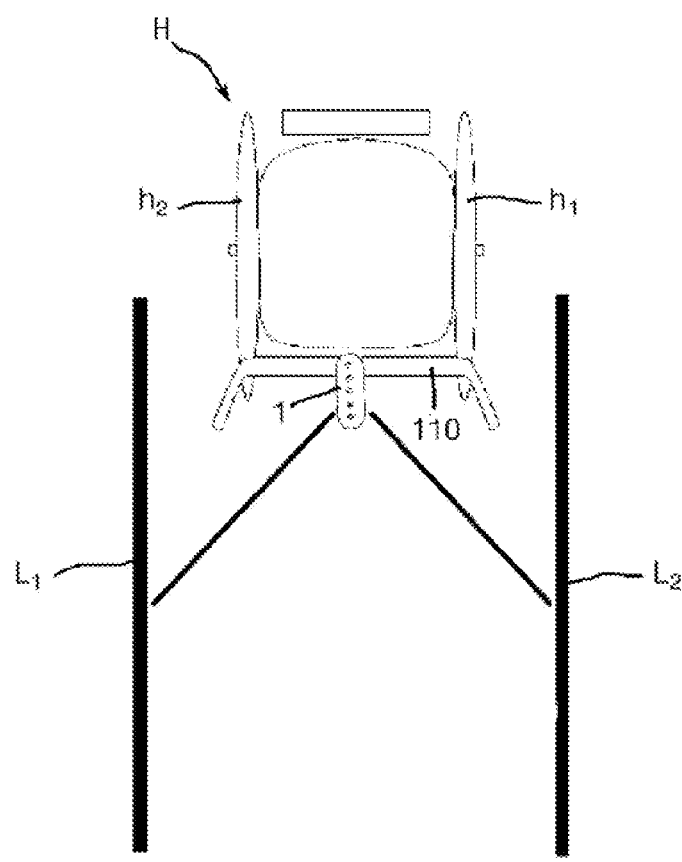

FIGS. 9a and 9b illustrate the images when the device of the invention is mounted on a two-wheeled auxiliary transport vehicle and marks the riding lines during riding (as mentioned above, of course, the device is not limited to the wheelchairs), wherein FIG. 9a illustrates the side view of a general wheelchair, and FIG. 9b illustrates the plan view of the device of the invention.

Referring to the Figures, the image shows the device 1 mounted on a general wheelchair H, and if the wheelchair H has a frame portion 110, desirably, the device 1 is mounted at the rear surface of the wheelchair H. As mentioned above, the device 1 of the invention indicates the riding lines $L_1$ and $L_2$ spaced apart from each other beside or behind the wheels $h_1$ and $h_2$ during the riding of the wheelchair H, thereby allowing the drivers existing behind the wheelchair H to easily recognize the existence of the wheelchair H and to maintain the safety distance therefrom. Moreover, as mentioned above, if the direction-indicating light function is additionally provided to the device 1 of the invention, when the wheelchair H is moved forwardly, backwardly, or to the left and right sides, the direction-indicating function is performed like general automobiles, thereby more improving the safety of the wheelchair H.

The direction-indicating light is manipulated by the manipulating switch mounted on the seat of the wheelchair H, and as mentioned above, the flashing signal of the direction-indicating light is performed through the flashing of the LEDs. In some cases, the laser-emitting module 300 is flashed together with the direction-indicating light, and alternatively, the laser-emitting module 300 is flashed alone, thereby being used as the direction-indicating light.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A device for marking riding lines for a transport vehicle, comprising:

laser-emitting modules 300 adapted to form luminous lines spaced apart from each other by a predetermined distance on the road beside or behind the transport vehicle 100, each laser-emitting module 300 has a light source-producing unit 310 adapted to produce the luminous line therefrom and a light-guiding unit 320 adapted to adjust the direction of the light produced from the light source-producing unit 310 to induce the formation of the luminous line, the light-guiding unit 320 being formed of a line-forming module adapted to diffuse or collect the light emitted from the light source-producing unit 310 in such a manner as to allow the diffused or collected light to be formed in a shape of the line having a given length along the road;

a power supply module 500 adapted to supply power to the laser-emitting modules 300;

an external housing A adapted to accommodate the laser-emitting modules 300 thereinto; and a fixing module 200 adapted to fix the external housing A to the transport vehicle 100 and having a gripping part 210 fixed to a given position of the transport vehicle and a fixing part 220 insertedly fixed into the gripping part 210 by means of a fixing member 230, so that the external housing A is moved up and down around the fixing member 230.

2. The device as defined in claim 1, wherein each laser-emitting module 300 has the light source-producing unit 310 adapted to produce the luminous line therefrom and the light-guiding unit 320 adapted to adjust the direction of the light produced from the light source-producing unit 310 to induce the formation of the luminous line.

3. The device as defined in claim 1, wherein the laser-emitting modules 300 are disposed correspondingly on both sides of the lower portion of the external housing A, and the external housing A has a warn-indicating module 400 mounted thereinto, the warn-indicating module 400 being formed of at least one or more LED lamps.

4. The device as defined in claim 3, wherein a portion of the external housing A, in which the warn-indicating module 400 is mounted to emit the light of LED lamps to the outside, is formed of a cover member made of a light permeable material.

5. The device as defined in claim 1, wherein the power supply module 500 is formed of a lithium-ion battery, a rechargeable battery, or a self generating module, which applies the power to the laser-emitting module 300 or the LED lamps.

6. The device as defined in claim 1, wherein the laser-emitting modules 300 are disposed correspondingly on both sides of the lower portion of the external housing A, and the external housing A has a warn-indicating module 400 in which at least one or more LED lamps are disposed mounted thereinto.

* * * * *